(12) United States Patent
Chen et al.

(10) Patent No.: US 12,024,002 B2
(45) Date of Patent: Jul. 2, 2024

(54) SOLAR BED COVER FOR PICKUP TRUCK

(71) Applicant: Ningbo Crosstrip Electronic Science Co., Ltd, Cixi (CN)

(72) Inventors: Lei Chen, Cixi (CN); Lei Qiu, Cixi (CN)

( * ) Notice: Subject to any disclaimer, the term of this patent is extended or adjusted under 35 U.S.C. 154(b) by 103 days.

(21) Appl. No.: 17/864,884

(22) Filed: Jul. 14, 2022

(65) Prior Publication Data

US 2023/0398845 A1  Dec. 14, 2023

(30) Foreign Application Priority Data

Jun. 9, 2022 (CN) .......................... 202210646525.7

(51) Int. Cl.
*B60J 7/14* (2006.01)
*B60L 8/00* (2006.01)
*B60P 7/02* (2006.01)

(52) U.S. Cl.
CPC .............. *B60J 7/141* (2013.01); *B60L 8/003* (2013.01); *B60P 7/02* (2013.01)

(58) Field of Classification Search
CPC ....... B60J 7/14; B60J 7/141; B60J 7/16; B60J 7/1607; B60J 7/1614; B60L 8/003; B60P 7/02
USPC ............................ 296/100.02, 100.06, 100.1
See application file for complete search history.

(56) References Cited

U.S. PATENT DOCUMENTS

| | | | | |
|---|---|---|---|---|
| 11,584,207 B2* | 2/2023 | Williams | ................ | B60L 8/003 |
| 11,701,954 B2* | 7/2023 | Kneifl | ................ | B62D 33/0273 |
| | | | | 296/100.1 |
| 11,760,177 B2* | 9/2023 | Rossi | ........................ | B60J 7/141 |
| | | | | 296/100.09 |
| 2013/0328348 A1* | 12/2013 | Agnew | ................... | B60L 8/003 |
| | | | | 296/136.03 |
| 2015/0251539 A1* | 9/2015 | Sura | ....................... | H01L 31/048 |
| | | | | 290/1 R |
| 2021/0291633 A1* | 9/2021 | Gu | ............................ | B60P 7/02 |
| 2023/0173898 A1* | 6/2023 | Dawson | ................ | B60R 16/033 |
| | | | | 296/100.06 |

* cited by examiner

*Primary Examiner* — Jason S Daniels

(57) ABSTRACT

A solar pickup truck bed cover, including a supporting system, a solar panel, a power storage system and a fixing clamp assembly; the solar panel is connected to the cargo hopper through the supporting system; the power storage system includes a power storage box, the power storage box is connected to the supporting system through the fixing clamp assembly. The solar panel includes a large panel, a medium panel and a small panel, the supporting system includes a large panel frame, a medium panel frame and a small panel frame, the large panel is connected to the large panel frame, the medium panel is connected to the medium panel frame, and the small panel is connected to the small panel frame.

8 Claims, 15 Drawing Sheets

SOLAR BED COVER FOR PICKUP TRUCK

CROSS REFERENCE TO RELATED APPLICATION

This application claims priority benefit of Chinese Invention Application No. 202210646525.7, filed on Jun. 9, 2022, and the entire contents of which are incorporated herein by reference.

TECHNICAL FIELD

This invention is relevant to automobile accessories field, especially about the solar bed cover for pickup truck.

BACKGROUND TECHNOLOGY

The cargo hopper of the pickup truck (also known as sedan truck) often used to carry goods, since the cargo hopper is open, people invented the bed cover to avoid wetting the goods in the cargo hopper in rainy and snowy weather. Install the bed cover on the cargo hopper of the pickup truck, and using, the cover to prevent the goods in the cargo hopper from getting wet by rain.

The current pickup truck bed cover structure is described below, however customers hope current cover has updated additional functions on the basis of sheltering from the wind and rain. Since new energy vehicles have been generally accepted by the market, a bed cover with power storage function is sure to be accepted by the market. This bed cover can not only increase the driving range of electric vehicles, but also store electricity for customers to use outdoors, such as provide power for electric kettles, cookers, Etc. It not only increases the customer's sense of outdoor experience, but also increases the fun of outdoor play.

ABOUT THE INVENTION

The purpose of the invention is to provide a solar bed cover for pickup truck, which can convert light energy into electric energy for customers to use by improving the structure.

To solve the existing technical problem above, thus the invention use the following method:

A solar bed cover for pickup truck include a supporting system, a solar panel, a power storage system and a fixing clamp assembly;

The solar panel is connected to the cargo hopper through the supporting system;

Wherein the power storage system include a power storage box, wherein the power storage box is connect to the supporting system through a fixing clamp assembly.

By setting solar panels, the light energy is converted into electrical energy during the driving and stored it in the power storage box, providing real-time mobile power for drivers during outdoor activities. And it can also provide emergency power when the new energy automobile is exhausted, allowing the car to travel about 30 kilometers in an emergency.

Further, the solar panel includes a large panel, a medium panel and a small panel, the supporting system includes a large panel frame, a medium panel frame and a small panel frame, the large panel is connected to the large panel frame, and the medium panel is connected to the a medium panel frame, the small panel is connected to the small panel frame. The supporting system is designed with multiple frames, each frame is correspondingly installed with a solar panel.

By setting different frames, the solar panel are divided into several pieces, so that the bed cover of the pickup truck can be partially opened, which neither affects the use nor the power generation of solar energy.

Further, the large panel frame includes a large rectangular frame composed of a left rail, a middle bar, a large front rail and a right rail, the left rail and the right rail are set opposite to each other, and the middle bar and the large front rail also set correspondingly. The frame structure is not only easy to replace and install, but also can protect the solar panel well. The large rectangular frame is connected with a front rail fixing system. The front rail fixing system includes a front rail fixing bar, a large panel right reinforcing bar and a large panel left reinforcing bar. The front rail fixing bar is connected with a square fixing screw, the front rail fixing bar is provided with a slot, the square fixing screw is engaged with the slot. The large panel frame is supported by the front rail fixing bar, meanwhile the large panel left reinforcing bar and the large panel right reinforcing bar are used together to improved the force strength and supporting strength of the large panel frame. The large panel reinforcing bar is provided with a cutout whose function is to hold the front rail fixing bar.

Further, the large panel frame also includes a large panel right connector for connecting the large front rail and the right rail, a large panel left connector for connecting the large front rail and the right rail, a large panel middle bar left connector for connecting the right rail and the middle bar, the large panel middle bar right connector for connecting the left rail and the middle bar. By setting the corner connector and the middle bar connector, the left rail, the right rail, the middle bar and the large front rail are connected to form a rectangular frame, the large panel frame is provided with a fixing groove for connecting the large panel and a wire groove for routing. By setting the wire groove, it is easy to route the wire, making the whole circuit more neat and nice.

Further, the small panel frame includes a small rectangular frame composed of a small panel right rail, a small panel middle bar, a small panel left rail and a tail rail, the left rail and the right rail are set opposite to each other, and the middle bar and the large front rail also set correspondingly; the frame structure is not only easy to replace and install, but also can protect the solar panel well. The small panel frame is connected with a lateral wrench system, the lateral wrench system includes a lateral wrench bar and a small panel reinforcing bar, both ends of the lateral wrench bar are respectively connected with a wrench assembly, the wrench assembly includes a slider and a wrench base respectively engaged with the lateral wrench bar, the slider is slidable to connect the lateral wrench bar, the slider is connected with a wrench. The small panel frame is supported by the lateral wrench bar, meanwhile the small panel left reinforcing bar and the small panel right reinforcing bar are used together to improved the force strength and supporting strength of the small panel frame. The small panel reinforcing bar is provided with a cutout whose function is to clamp the transverse wrench bar.

Further, the structure of the medium panel frame is the same as that of the small panel frame. Since the large panel frame, the medium panel frame and the small panel frame have the same structure but only different dimensions, the corner connectors and middle bar connectors can be used in common, only one size needs to be processed during production and processing. The small panel right rail and the tail rail is connected by the small panel right connector, the small panel right rail and the small panel middle bar is connected by the small panel middle bar right connector, the small panel left rail and the tail rail is connected by the small panel left connector, the small panel left rail and the small panel middle bar is connected by the a small panel middle bar left connector. By setting corner connectors and middle bar connectors, the left rail, right rail, middle bar and large front rail can be connected to form a rectangular frame.

Further, the two wrench bases are arranged between the two sliders. The lateral wrench system is used to connect the supporting system to the cargo hopper. When in use, turn the wrench to clamp the supporting system and the cargo hopper. When it needs to be opened, turn the wrench to loosen the support system and the cargo hopper, and then move the wrench to the wrench base through the slider, as long as the support assembly is open, the wrench does not collide with the support assembly, the support assembly can be turned and opened.

Further, the large panel frame and the medium panel frame are connected by a large shaft, the medium panel frame and the small panel frame are connected by a medium shaft. The large panel frame, the medium panel frame and the small panel frame are connected by rotating shafts, and users only need to rotate the supporting assembly to open, which is convenient to operate. The lateral wrench bar is provided with a slot for connecting the wrench base and the slider, both ends of the slot are respectively connected with a plug. The center of the lateral wrench bar is provided with a maintenance hole, through which the wrench base and the slider can be removed. When in use, slide the wrench base and the slider to the maintenance hole and take it out, users can repair the wrench.

Further, both ends of the small panel reinforcing bar are respectively connected to the small panel frame through a reinforcing bar fixing block, there are a plurality of the small panel reinforcing bar, the small panel reinforcing bar is provided with locating holes. By the setting locating holes, the connection of the reinforcing bar and the supporting assembly is facilitated. The solar panel is designed in the structure of a large panel, a medium panel and a small panel, the large panel frame, the medium panel frame and the small panel frame are connected in sequence, so that the small panel and the medium panel can be opened, which is convenient for picking and placing items in the cargo hopper. When using, you can open only the small panel, or open both the small panel and the medium panel as needed.

Further, the power storage system includes a power storage system cable and a photovoltaic junction box, the power storage box is provided with a power storage box socket and a power storage box locating hole, the photovoltaic junction box is inserted into the power storage system box socket through the power storage system cable, the storage box locating hole is arranged on the top of the storage box. By setting the storage box locating hole, the power storage box can be positioned to prevent the power storage box from deviating during the driving.

Further, the fixing clamp assembly includes a fixing clamp, an upper clamp and a lower clamp, the fixing clamp is provided with a fixing clamp groove, the upper clamp is provided with an adhesive side matched with the fixing clamp groove, the lower clamp is connected with the fixing clamp by bolts, the lower clamp is "L" shaped, the lower clamp is connected with a plum screw for supporting the fixing clamp, the lower clamp is also provided with a lower clamp barrier block for limiting the upper clamp, the lower clamp barrier block is arranged on the side away form the fixing clamp groove of the upper clamp, the fixing clamp groove is wave-shaped, the upper clamp also includes an upper clamp flat block, the upper clamp flat block is provided with a front rail fixing hole, the adhesive side is bond with waterproof tape. When using, clamp the side rail of the cargo hopper by the cooperation of the fixing clamp components. First, connect the fixing clamp and the lower clamp with bolts; then pass the square fixing screw through the front rail fixing hole on the upper clamp, clamp the side rail of the cargo hopper through the cooperate of the fixing clamp and the upper clamp, tight the bolts; finally connect the plum screw with the lower clamp to tighten the fixing clamp. By connecting with the square fixing screw, the square fixing screw provides an upward pulling force to the upper clamp, so that the fixing clamp assembly can be clamped while ensuring the stability of the connection between the large panel frame and the cargo hopper.

Further, the solar bed cover includes an anti moving clamp system, the anti moving clamp system includes a fixing clamp; a locating upper clamp and a locating lower clamp, the locating upper clamp includes a connecting arm and a fixing block, the fixing block is connected to the upper clamp flat block through the connecting al n, the anti moving clamp system operates in the same way as the fixing clamp assembly, the locating upper clamp extends the connecting arm and the fixing block into the power storage box to fix the storage box and prevent it from sliding.

The advantages of the invention is that by setting the solar panel, light energy can be converted into electric energy and stored in the power storage box during driving, so as to provide mobile power for the users in real time during outdoor activities. It can also provide emergency power when the new energy automobile is exhausted, allowing the car to travel about 30 kilometers in an emergency.

Figure 1:
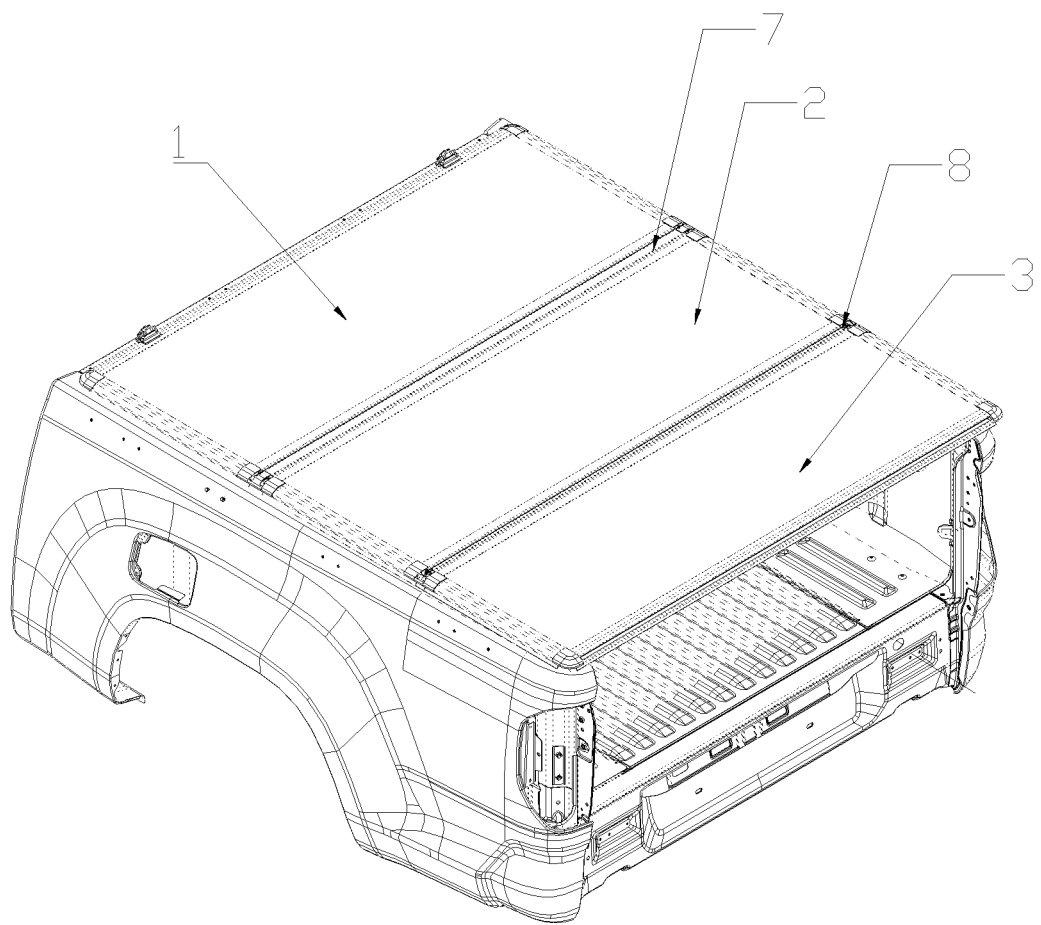
FIG. 1 is a installation drawing of the solar bed cover in, the invention.

Large panel; 101—Large panel right connector; 102—Left rail; 1021—Fixing groove; 1022—Wire groove; 103—Large panel middle bar right connector; 104—Middle bar; 105—Large panel middle bar left connector; 106—Right rail; 107—Large panel left connector; 108—Front rail; 109—Front rail fixing bar; 110—Square fixing screw; 111—Large panel right reinforcing bar; 112—Large panel left reinforcing bar; 113—Solar panel, 115—Plug; 2—Medium panel; 3—Small panel; 301—Small panel right connector; 302—Small panel right rail; 303—Small panel middle bar right connector, 305—Small panel middle bar; 306—Small panel middle bar left connector; 307—Small panel left rail; 308—Small panel left connector, 309—Tail rail; 310—Lateral wrench bar; 3101—Maintenance hole; 311—Small panel reinforcing bar; 313—Slider; 314—Wrench; 315—Wrench base; 316—reinforcing bar fixing block; 3161—locating hole; 401—Fixing clamp; 4012—Fixing clamp groove, 403—Waterproof adhesive tape; 404—Upper clamp; 4041—Front rail fixing hole; 4042—Adhesive side; 405—Lower clamp; 4051—Lower clamp barrier block; 406—Plum screw; 5011—Fixing block; 5012—Connecting arm; 5013—Upper clamp flat block; 6—Power storage system; 601—Power storage box; 6011—Power storage box socket; 6012—Power storage box locating hole; 602—Power storage system cable; 603—Photovoltaic junction box; 7—Large shaft; 8—Medium shaft.

The Concrete Method to Carry Out

The following instruction further explains the invention's concrete implementation method.

In order to enable a clearer understanding of the above-mentioned objects, features and advantages of the present invention, the present invention will be described in detail below in connection with the accompanying drawings and specific embodiments. It should be noted that the embodiments of the present application and the features in the embodiments can be combined with each other without conflict.

The terms "first," "second," "third," etc. are only used to differentiate the description and should not be understood as indicating or implying relative importance.

In the description, it should also be noted that, unless otherwise expressly specified and limited, the terms "arranged," "installed," "connected," and "combined" should be understood in a broad sense; for example, it may be a fixing connection, it can also be a detachable connection or an integral connection; it can be a mechanical connection or an electrical connection; it can be a direct connection or an indirect connection through an intermediate media, and it can be internal connection within two components. For those of ordinary skill in this field, the meanings of the above terms in the present invention can be understood in specific situations.

The specific embodiments of the present invention will be described in detail below in connection with the accompanying drawings. It should be understood that the specific embodiments described herein are intended only to illustrate and explain the present invention and are not intended to limit it.

EMBODIMENT 1

Figure 2:
FIG. 2 is the structural illustration of the solar bed cover in the invention.
Figure 3:
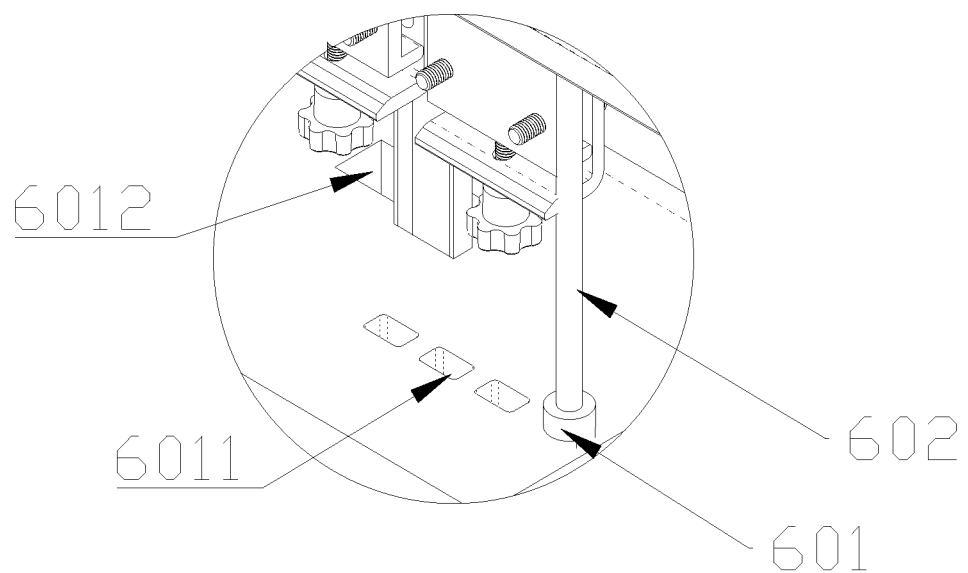
FIG. 3 is a partial enlarged view of part A in FIG. 2.
Figure 13:
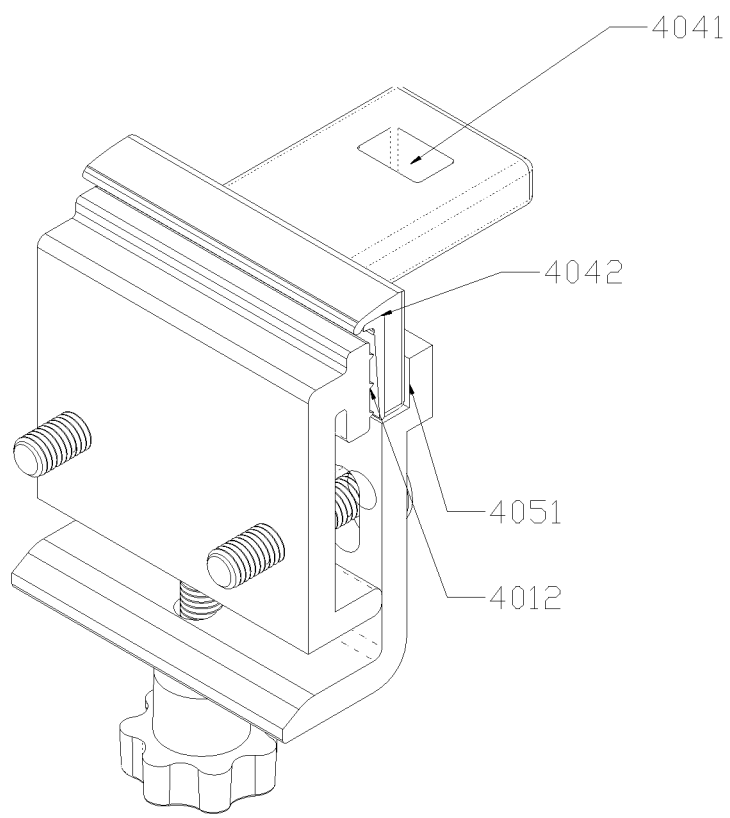
FIG. 13 is the structural schematic diagram 1 of the fixing clamp assembly.

As shown in FIGS. 1-3 and 13, a solar truck bed cover includes a supporting system, a solar panel (113), a power storage system (6) and a fixing clamp assembly.

The solar panel (113) is connected to the cargo hopper through the supporting system.

The power storage system (6) include a power storage box (601), wherein the power storage box (601) is connect to the supporting system through a fixing clamp assembly.

By arranging the solar panel (113), the light energy can be converted into electric energy during driving and stored it in the power storage box (601), providing mobile power for the users in real time during outdoor activities. And it can also provide emergency power when the new energy automobile is exhausted, allowing the ear to travel about kilometers in an emergency.

EMBODIMENT 2

Figure 4:
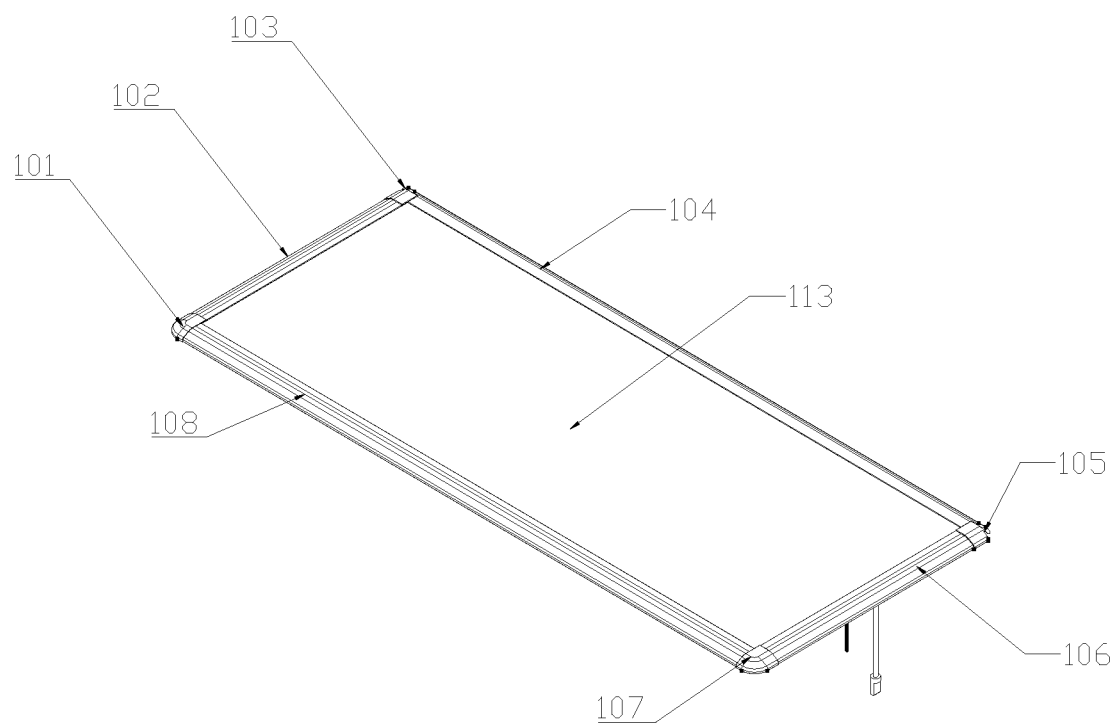
FIG. 4 is the structural schematic diagram 1 of the large panel frame in FIG. 2.
Figure 5:
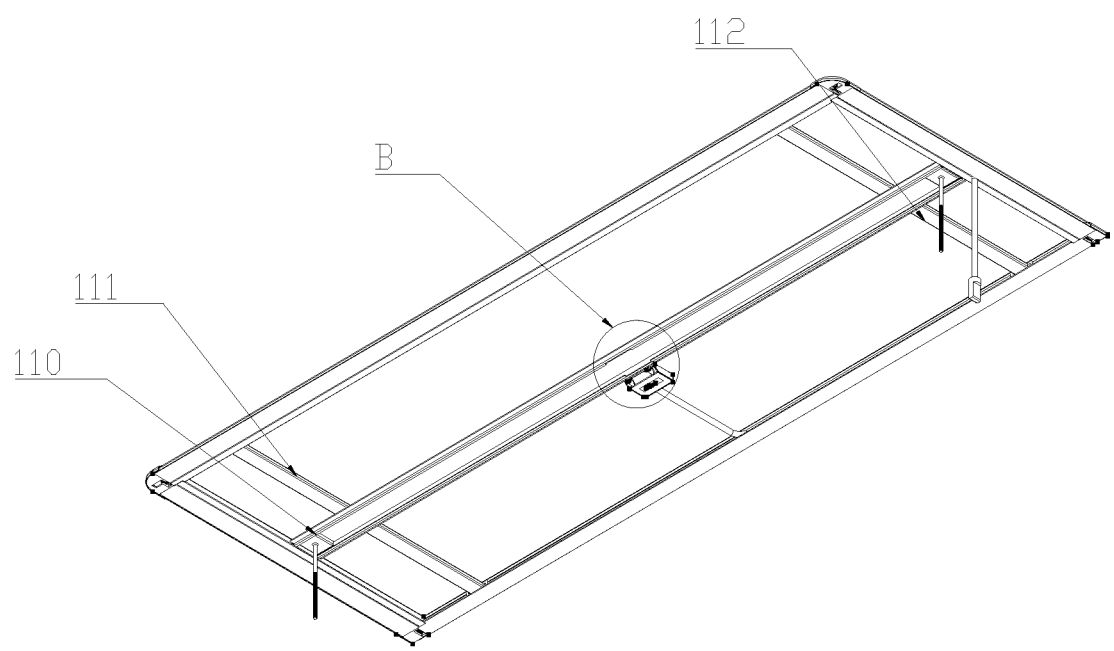
FIG. 5 is the rear view of FIG. 4.
Figure 6:
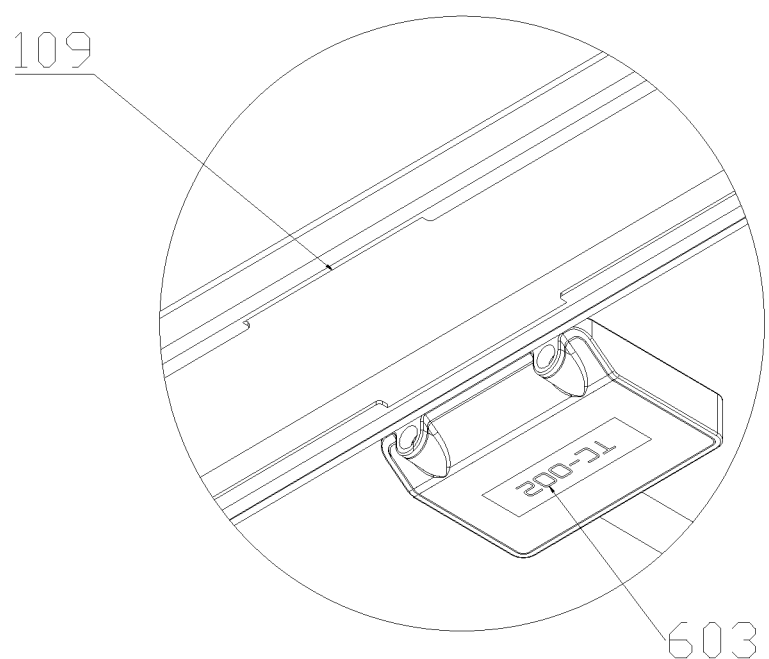
FIG. 6 is a partial enlarged view of part B in FIG. 5.
Figure 7:
FIG. 7 is the structural schematic diagram 2 of the large panel frame.
Figure 8:
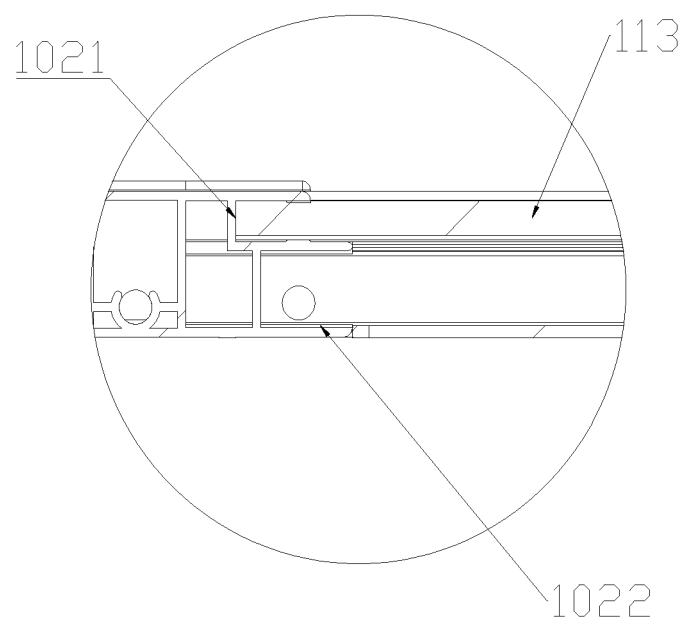
FIG. 8 is a partial enlarged view of part C in FIG. 7.
Figure 9:
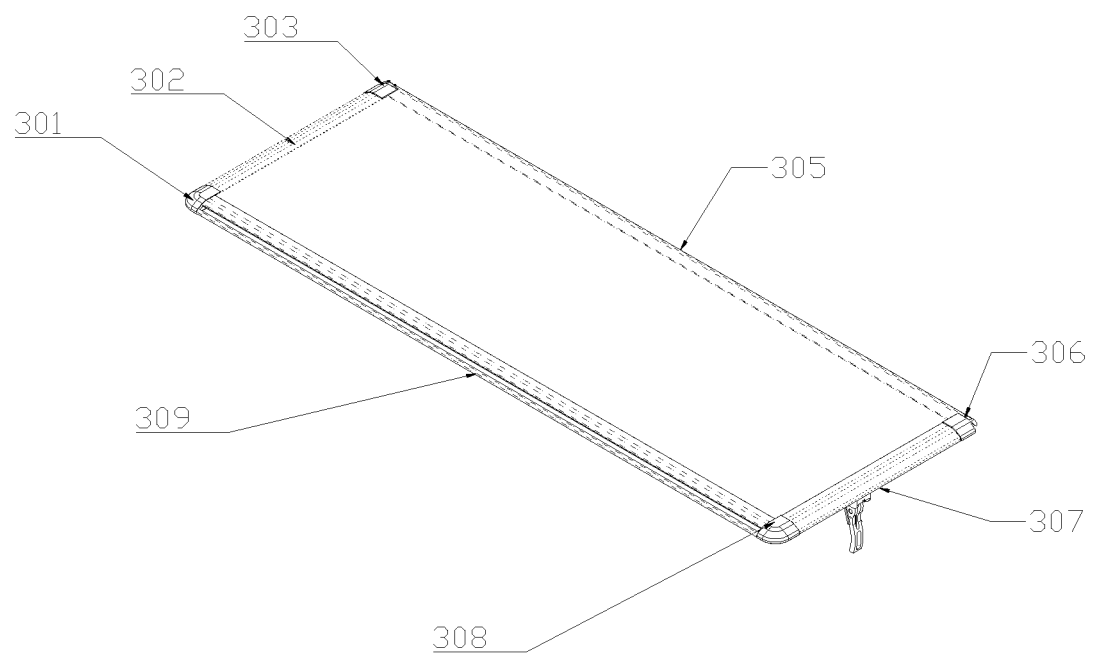
FIG. 9 is the structural schematic diagram 1 of the small panel frame in FIG. 2.
Figure 10:
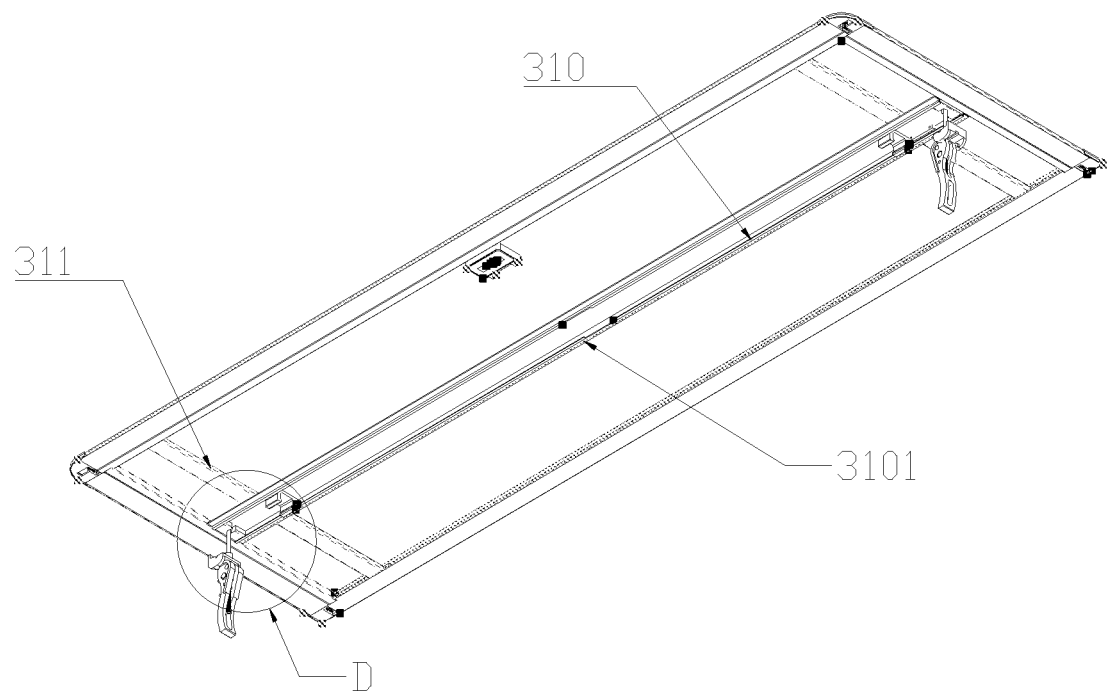
FIG. 10 is the structural schematic diagram 2 of the small panel frame in FIG. 2.
Figure 11:
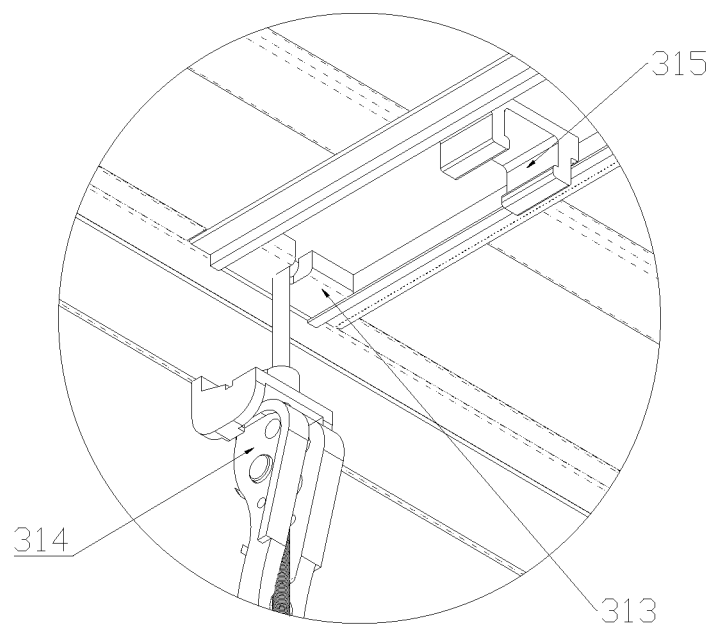
FIG. 11 is a partial enlarged view of part D in FIG. 10.
Figure 12:
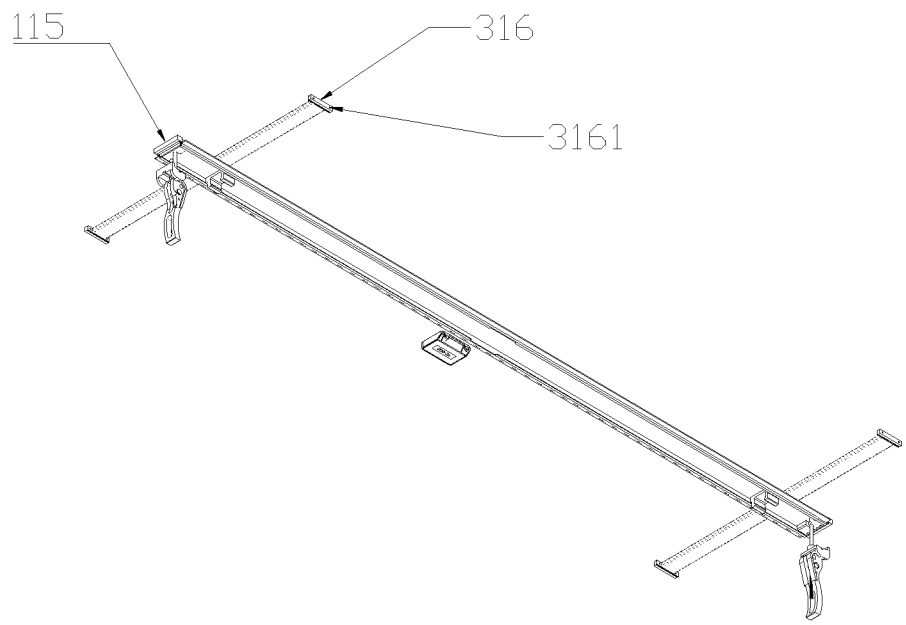
FIG. 12 is a structural schematic diagram 1 of lateral wrench bar.
Figure 14:
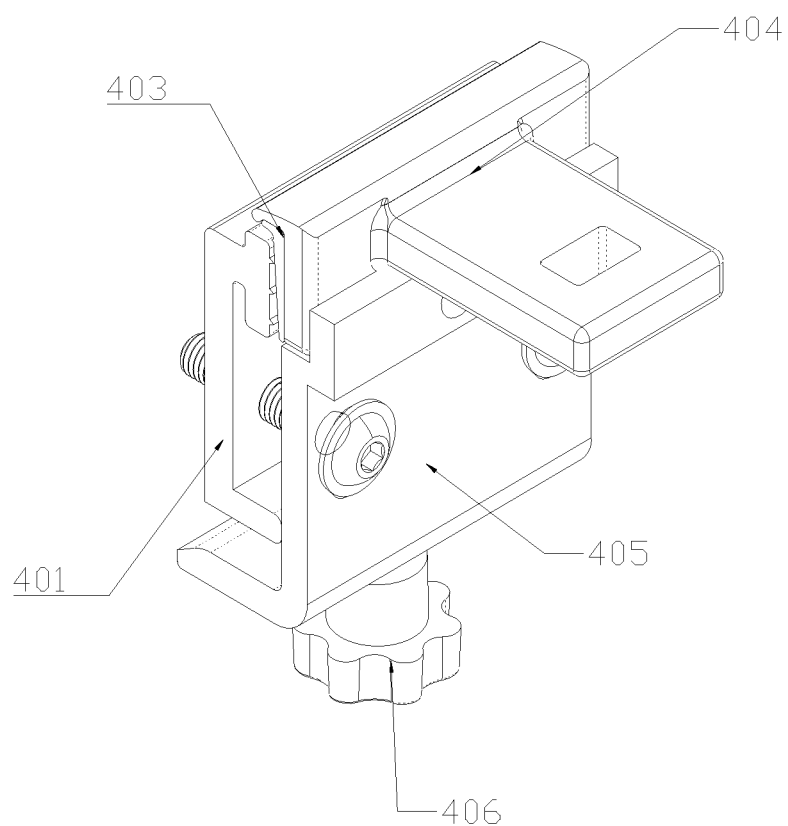
FIG. 14 is the structural schematic diagram 2 of the fixing clamp assembly.
Figure 15:
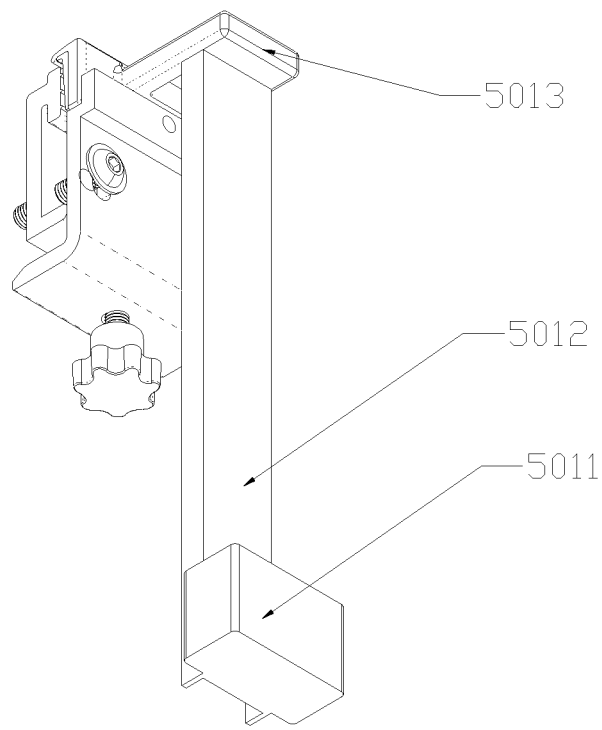
FIG. 15 is a schematic diagram of the structure of the anti moving clamp system.

As shown in FIGS. 1-15, a solar bed cover for pickup truck includes a supporting system, a solar panel (113), a power storage system (6) and a fixing clamp assembly.

The solar panel (113) is connected to the cargo hopper through the supporting system.

The power storage system (6) include a power storage box (601), wherein power storage box (601) is connect to the supporting system through a fixing clamp assembly.

By arranging the solar panel (113), the light energy can be converted into electric energy during driving and stored it in the power storage box (601), providing mobile power for the users in real time during outdoor activities. And it can also provide emergency power when the new energy automobile is exhausted, allowing the ear to travel about kilometers in an emergency.

The solar panel (113) include a large panel (1), a medium panel (2) and a small panel (3).

The supporting system include a large panel frame, a medium panel frame and a small panel frame, the large panel (1) is connect to the large panel frame, the medium panel (2) is connect to the medium panel frame, and the small panel (3) is connect to the small panel frame.

The supporting system is designed with multiple frames, each frame is correspondingly installed with a solar panel (113).

The large panel frame include a large rectangular frame composed of a left rail (102), a middle bar (104), a large front rail (108) and a right rail (106), the large rectangular frame is connected with a front rail fixing system, the front rail fixing system includes a front rail fixing bar (109), a large panel right reinforcing bar (111) and a large panel left reinforcing, bar (112).

The front rail fixing bar (109) is connected with square fixing screw (110), the front rail fixing bar (109) is provided with a slot, the square fixing screw (110) is engaged with the slot.

The large panel frame also includes a large panel right connector (101) for connecting the large front rail (108) and the right rail (106), a large panel left connector (107) for connecting the large front rail (108) and the right rail (106), a large panel middle bar left connector (105) for connecting the right rail (106) and the middle bar (104), the large panel middle bar right connector (103) for connecting the left rail (102) and the middle bar (104).

The large panel frame is provided with a fixing groove (1021) for connecting the large panel (1) and a wire groove (1022) for routing.

The small panel frame include a small rectangular frame composed of a small panel right rail (302), a small panel middle bar (305), a small panel left rail (307) and a tail rail (309), the small rectangular frame is connected with a lateral wrench system; the lateral wrench system includes a lateral wrench bar (310) and small panel reinforcing bar (311), both ends of the lateral wrench bar (310) are respectively connected with a wrench assembly, the wrench assembly includes a slider (313) and a wrench base (315) respectively engaged with the lateral wrench bar (310), the slider (313) is slidable to connect the lateral wrench bar (310), the slider (313) is connected with the wrench (314). The structure of the medium panel frame is the same as that of the small panel frame.

The small panel right rail (302) and the tail rail (309) is connected by the small panel right connector (301), the small panel right rail (302) and the small panel middle bar (305) is connected by the small panel middle bar right connector (303), the small panel left rail (307) and the tail rail (309) is connected by the small panel left connector (308), the small panel left rail (307) and the small panel middle bar (305) is connected by the a small panel middle bar'left connector (306).

Two wrench bases (315) are arranged between the two sliders (313). The lateral wrench system is used to connect the supporting system to the cargo hopper.

When in use, turn the wrench (314) to clamp the supporting, system and the cargo hopper. When it needs to be opened, turn the wrench (314) to loosen the support system and the cargo hopper, and then move the wrench (314) to the wrench base (315) through the slider to open the supporting assembly.

The large panel frame and the medium panel frame are connected by a large shaft (7), the medium panel frame and the small panel frame are connected by a medium shaft (8).

The lateral wrench bar (310) is provided with a slot for connecting the wrench base (315) and the slider (313), both ends of the slot are respectively connected with a plug (115).

The center of the lateral wrench bar (315) is provided with a maintenance hole (3101), through the maintenance hole (3101) the wrench base (315) and the slider (313) can be removed.

Both ends of the small panel reinforcing bar (311) are respectively connected to the small panel frame through a reinforcing bar fixing block (316), there are a plurality of the small panel reinforcing bar (311), the reinforcing bar fixing block (316) is provided with locating holes (3161).

The solar panel (113) is designed in the structure of a large panel (1), a medium panel (2) and a small panel (3), the large panel frame, the medium panel frame and the small panel frame are connected in sequence, so that the small panel (2) and the medium panel (3) can be opened, which is convenient for picking and placing items in the cargo hopper. When using, you can open only the small panel (3), or open both the small panel (3) and the medium panel (2) as needed.

The power storage system (6) further includes a power storage system cable (602) and a photovoltaic junction box (603), the power storage box (601) is provided with a power storage box socket (6011) and a power storage box locating hole (6012), the photovoltaic junction box (603) is inserted into the power storage box socket (6011) through the power storage system cable (602).

The power storage box locating hole (6012) is arranged on the top of the storage box (601).

By setting the storage box locating hole (6012), the power storage box (601) can be positioned to prevent the power storage box (601) from deviating during the driving.

The fixing clamp assembly includes a fixing clamp (401), an upper clamp (404) and a lower clamp (405);

The fixing clamp (401) is provided with a fixing clamp groove (4012).

The upper clamp (404) is provided with an adhesive side (4042) matched with the fixing clamp groove (4012).

The lower clamp (405) is connected with the fixing clamp (401) by bolts.

The lower clamp (405) is "L" shaped, the lower clamp (405) is connected with a plum screw for supporting the fixing clamp (401).

The lower clamp (405) is provide with a lower clamp barrier block (4051) for limiting the upper clamp (404), the lower clamp barrier block (4051) is arranged on the side away form the fixing clamp groove (4012) of the upper clamp (404).

The fixing clamp groove (4012) is wave-shaped.

The upper locating clamp (404) includes upper clamp flat block (5013), the upper clamp flat block (5013) is provided with a front rail fixing hole (4041).

The adhesive side (4042) is bond with waterproof tape (403).

When using, clamp the side rail of the cargo hopper by the cooperation of the fixing clamp components.

First, connect the fixing clamp (401) and the lower clamp (405) with bolts; then pass the square fixing screw (110) through the front rail fixing hole (4041) on the upper clamp through, clamp the side rail of the cargo hopper through the cooperate with the fixing clamp (401) and the upper clamp (405), tight the bolts; finally connect the plum screw (406) with the lower clamp (405) to tighten the fixing clamp (401). By connecting with the square fixing screw (110), the square fixing screw provides an upward pulling force to the upper clamp (404), so that the fixing clamp assembly can be clamped while ensuring the stability of the connection between the large panel frame and the cargo hopper.

Further, the solar bed cover includes an anti moving clamp system, the anti moving clamp system includes a fixing clamp (401), a locating upper clamp and a locating lower clamp, the locating upper clamp includes a connecting arm (5012) and a fixing block (5011), the fixing block (5011) is connected to the upper clamp flat block (5013) through the connecting arm (5012).

The anti moving clamp system operates in the same way as the fixing clamp assembly, the locating upper clamp extends the connecting arm (5012) and the fixing block (5011) into the power storage box (601) to fix the storage box and prevent it from sliding.

The present invention is not limited to the above-mentioned optional embodiments, anyone can draw other various forms of products under the inspiration of the present invention. However, no matter what changes are made in its shape or structure, all technical solutions that fall within the scope defined by the claims of the present invention should fall within the protection scope of the present invention.

What is claimed is:

1. A solar bed cover for a pickup truck comprising:
a supporting system,
a solar panel (113),
a power storage system (6), and
a fixing clamp assembly; wherein
the solar panel (113) is connected to a cargo hopper through the supporting system;
the power storage system (6) includes a power storage box (601), wherein the power storage box (601) is connected to the supporting system through a fixing clamp assembly;
wherein the solar panel (113) includes a large panel (1), a medium panel (2) and a small panel (3), the supporting system includes a large panel frame, a medium panel frame and a small panel frame, the large panel (1) is connected to the large panel frame, the medium panel (2) is connected to the medium panel frame, and the small panel (3) is connected to the small panel frame.

2. The solar bed cover for a pickup truck according to claim 1, wherein, the large panel frame includes a large rectangular frame composed of a left rail (102), a middle bar (104), a large front rail (108) and a right rail (106), wherein, the large rectangular frame is connected with a front rail fixing system, wherein a front rail fixing bar (109) is connected with a square fixing screw (110).

3. The solar bed cover for a pickup truck according to claim 1, wherein, the small panel frame includes a small rectangular frame composed of a small panel right rail (302), a small panel middle bar (305), a small panel left rail (307) and a tail rail (309), wherein, the small rectangular frame is connected with a lateral wrench system; the lateral wrench system includes a lateral wrench bar (310), both ends of the lateral wrench bar (310) are respectively connected with a wrench assembly, the wrench assembly includes a slider (313) and a wrench base (315) respectively engaged with the lateral wrench bar (310), the slider (313) is slidably connected to the lateral wrench bar (310), and the slider (313) is connected with the wrench (314).

4. The solar bed cover for a pickup truck according to claim 2, wherein the power storage system (6) further includes a power storage system cable (602) and a photovoltaic junction box (603), the power storage box (601) is provided with a power storage box socket (6011) and a power storage box locating hole (6012), the photovoltaic junction box (603) is inserted into the power storage box socket (6011) through the power storage system cable (602), the power storage box locating hole (6012) is arranged on the top of the storage box (601).

5. A solar bed cover for a pickup truck, comprising:
a supporting system,
a solar panel (113),
a power storage system (6), and
a fixing clamp assembly; wherein
the solar panel (113) is connected to a cargo hopper through the supporting system;
the power storage system (6) includes a power storage box (601), wherein the power storage box (601) is connected to the supporting system through a fixing clamp assembly;
wherein the fixing clamp assembly includes a fixing clamp (401), an upper clamp (404) and a lower clamp (405);
the fixing clamp (401) is provided with a fixing clamp groove (4012);
the upper clamp (404) is provided with an adhesive side (4042) matched with the fixing clamp groove (4012);
the lower clamp (405) is connected with the fixing clamp (401) by bolts.

6. The solar bed cover for a pickup truck according to claim 5, wherein, the lower clamp (405) is "L" shaped, the lower clamp (405) is connected with a bolt for supporting the fixing clamp (401), the lower clamp (405) is provide with a lower clamp barrier block (4051) for limiting the upper clamp (404), the lower clamp barrier block (4051) is arranged on a side away form the fixing clamp groove (4012) of the upper clamp (404).

7. The solar bed cover for a pickup truck according to claim 6, wherein, the fixing clamp groove (4012) is wave-shaped.

8. The solar bed cover for a pickup truck, comprising:
a supporting system,
a solar panel (113),
a power storage system (6), and
a fixing clamp assembly; wherein
the solar panel (113) is connected to a cargo hopper through the supporting system;
the power storage system (6) includes a power storage box (601), wherein the power storage box (601) is connected to the supporting system through a fixing clamp assembly;
wherein, the solar bed cover further includes an anti-moving clamp system, wherein the anti-moving clamp system includes a fixing clamp (401), an upper locating clamp and a lower locating clamp, the upper locating clamp includes a connecting arm (5012) and a fixing block (5011), the fixing block (5011) is connected to the upper clamp flat block (5013) through the connecting arm (5012).

\* \* \* \* \*